3,161,171
AIR CUSHION VEHICLE
Olle Ljungström, Lidingo, Sweden, assignor to Svenska Aeroplan Aktiebolaget, Linkoping, Sweden, a corporation of Sweden
Filed Dec. 11, 1962, Ser. No. 243,803
Claims priority, application Sweden Dec. 14, 1961
4 Claims. (Cl. 114—67)

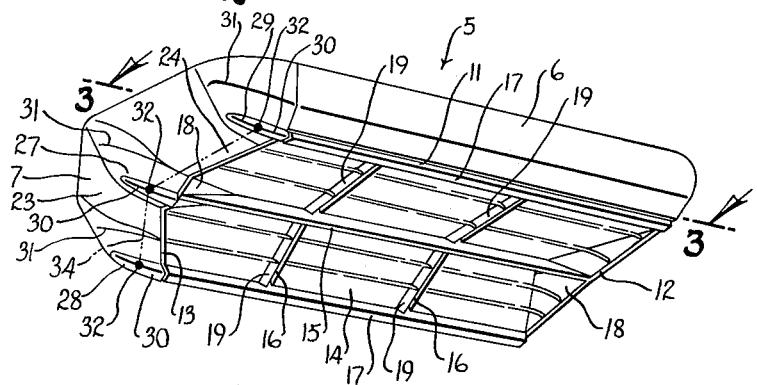

This invention relates to air cushion vehicles, which support themselves at a small distance above the surface of land or water by downward displacement of air, and the invention pertains more specifically to vehicles of this class which are particularly intended for travel over bodies of water of such size that waves of considerable height may be encountered.

Air cushion vehicles sustain themselves by displacing air downwardly, utilizing the so-called ground effect which, as is well known, enables a substantially greater lift to be produced with a given power when the vehicle is near the ground than would be obtained with the same power at what might be termed flight altitudes. Such vehicles can thus skim along a few inches above the surface of the land or water, supported on what may be considered a cushion of air. They are particularly valuable for travel over water because they can develop substantially greater speeds than conventional buoyant vessels of comparable horse-power, owing to the fact that air offers less drag than water.

However, because an air cushion vehicle moves along at only a few inches above the surface of water, it can be struck by the crest portions of waves, even when the water is only moderately rough. Each such wave impact against the vehicle decelerates it to an extent dependent upon the energy which the vehicle gives up to the water, and hence if the vehicle must literally batter its way through a substantial mass of water each time it encounters a wave, a choppy sea can produce a very rough ride.

A principal object of the present invention is to provide means in an air cushion vehicle for breaking or diminishing the force of waves that strike such a vehicle as it travels over water, so as to bring about desirably smooth riding qualities and avoid any tendency for the vehicle to founder in heavy seas.

More specifically it is an object of this invention to provide an air cushion vehicle having a bow portion on which there are pontoon-like lifting elements that are capable of providing hydrodynamic lift in consequence of their forward motion through water, which lifting elements extend lengthwise of the vehicle and are disposed at spaced intervals across its width, and are so arranged that they engage a wave successively, rather than simultaneously, to thus diminish the abruptness of the effect of the wave upon the vehicle.

Thus it is another object of this invention to provide means in an air cushion vehicle which is particularly intended for overwater use whereby the vehicle, upon encountering a wave, is caused to give up energy more or less gradually to the water, rather than attempting, in effect, to batter its way through the entire mass of water that it is encountering.

Still another object of this invention is to provide means in a vehicle of the class described for breaking the force of waves encountered by the vehicle by causing the front of the vehicle to partially ride up on the crest portion of each wave, due to hydrodynamic lifting action, and for partially breaking and diverting the crest portion of the wave as it passes beneath the vehicle, so as to further minimize the effect of the wave upon the vehicle.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

FIGURE 1 is a bottom perspective view of an air cushion vehicle embodying the principles of this invention;

FIGURE 2 is a side elevational view of the vehicle;

FIGURE 3 is a fragmentary longitudinal sectional view taken on the plane of the line 3—3 in FIGURE 1; and FIGURE 4 is a cross sectional view taken on the plane of the line 4—4 in FIGURE 2.

Referring now more particularly to the accompanying drawings, the vehicle 5 of this invention comprises, in general, a main body section or hull 6 that has a generally rectangular outline as seen from above or below, and a bow portion 7 on the front of the main body section. Amidships the body section 6 has an upwardly opening air intake 8 in which a propeller 9 is mounted for rotation on an upright axis. The propeller is driven by an engine (not shown) mounted in the body, and it pulls air downwardly through the intake 8 and expels it through downwardly opening outlets in the body (described hereinafter), which are communicated with the air intake by way of ducts 10 that extend through the body. The vehicle of course derives its support from the downward displacement of air effected by the propeller.

The downwardly opening air outlets in the hull or body section of the vehicle are narrow and slit-like. There are a pair of such outlets 11 which extend lengthwise of the body, one along each side of it; another such outlet 12 extends crosswise of the body at its rear; and still another such outlet, designated 13 extends across the body at its front. The four outlets 11, 12, and 13 are continuous with one another, and thus extend around the hull and define an inner bottom 14. Another lengthwise extending outlet 15 opens through the bottom wall 14 along the longitudinal centerline of the vehicle, and the hull can also have other crosswise extending outlets 16 in its bottom wall, at lengthwise spaced intervals along the vehicle and intermediate the front and rear outlets 13 and 12.

The bottom 14 of the body section is transversely concave, being shown as having an inverted V shape as viewed from the front or the rear of the vehicle. Along its opposite sides the body section of the vehicle has lengthwise extending runners 17, which project downwardly slightly below the adjacent side portions of the bottom wall and which have their front ends at the front transverse outlet 13 and their rear ends at the rear transverse outlet 12. The central lengthwise extending air outlet 15 is defined by lips or wall portions 18 which project downwardly from the bottom wall 14 almost to the level of the runners 17. At the front side of each of the transverse outlets 16 there is also a lip or projection 19 which extends downwardly from the bottom wall. The side outlets 11 are outwardly adjacent to the runners 17, and are arranged to discharge air at an inwardly and downwardly oblique angle.

It will be apparent that when the propeller is in operation, streams or curtains of air will flow downwardly from the outlets to provide an air cushion upon which the vehicle is supported at a small distance above the surface of land or water.

As best seen in FIGURE 1, the front air outlet 13 has substantially the shape of a shallow V as viewed from beneath the vehicle, the point of the V being foremost and on the longitudinal centerline and its legs extending obliquely rearwardly symmetrically to the centerline.

As viewed from above or below the vehicle, the front edge of the bow portion 7 likewise has the shape of a shallow V with its point foremost and on the longitudinal centerline of the vehicle. Since the rear end of the bow portion cooperates with the bottom wall 14 of the hull proper in defining the front outlet 13, the bow portion can be considered to have the general shape of a swept back wing.

At its top the bow portion has a substantially flat deck 21 which can be continuous with the deck 22 of the body section. The underside 23 of the bow portion is obliquely inclined downwardly and rearwardly, as well as facing obliquely sidewardly and forwardly. As mentioned above, the lower rear part of the bow portion forms the front wall 24 of the front transverse air outlet 13, and it is to be noted that it projects downwardly a substantial distance below the bottom wall 14 across most of the width of the latter, to cooperate with the bottom wall in defining a marked step at the underside of the vehicle.

At its underside the bow portion is formed with at least three pontoon-like lifting elements 27, 28 and 29. These lifting elements extend lengthwise of the vehicle, are spaced from one another across its width, and are symmetrically disposed with respect to its longitudinal centerline. As shown in the drawings, one of the lifting elements 27 is located on the longitudinal centerline of the vehicle and the other two, designated 28 and 29, are at the sides of the vehicle, directly in line with the runners 17, with which they would be continuous were it not for the interruption provided by the front outlet 13. The central lifting element 27, which likewise has its rear end at the front outlet 13, has its bottom at substantially the same level as the bottoms of the side lifting elements 28 and 29.

Each of the lifting elements is so shaped as to provide hydrodynamic lift in consequence of its forward motion in water, and has a V shaped bottom 30 and sharply angled bilge lines 31 in its sides. The lifting elements are arranged in such relation to one another that their hydrodynamic lift centers 32 lie along a V shaped line 34, the point of which is foremost and on the longitudinal centerline of the vehicle. Thus the legs of the V shaped line on which lie the centers of lift of the lifting elements substantially parallel the legs of the V defined by the front outlet 13, so that said centers of lift have an arrangement similar to that of a swept-back wing.

Because the lift centers of the lifting elements have the arrangement just described, a wave encountered head-on by the vehicle will first engage only the central lifting element 27, and then, after an interval of some tenths of a second, the two side lifting elements 28 and 29. A wave encountered from an obliquely forward direction will first engage the central lifting element 27 and one of the side lifting elements 28 or 29, and then, after an interval, the other side lifting element; or will encounter the several lifting elements successively. By correlating the sweep back angle of the line 34 along which the hydrodynamic lift centers lie with the approach velocity of oncoming waves, as determined by the velocity range of the vehicle, assurance can be had of this sequential engagement of the water with the lifting elements, with the result that such impact force as the water exerts against the vehicle is absorbed more or less gradually, and the vehicle is not required to give up energy to a large mass of water all at once.

The hydrodynamic lift of the lifting elements causes the bow of the vehicle to rise somewhat as a wave is encountered, so that the reaction between the wave and the vehicle is mainly converted into a lifting force on the vehicle rather than into deceleration of the vehicle's forward velocity. In addition, the shape of the pontoon-like lifting elements, with their V bottoms and sharp bilge lines, also diminishes the impact force of waves against the vehicle, especially in very heavy impacts on the bow portion, when the sharp bilge lines contribute to releasing water from the bow portion, between the lifting elements, and cause the water to be mixed with air so that its impact force on the underside of the bow portion is reduced.

The step defined by the front outlet 13 is particularly advantageous in that the lifting or supporting surfaces of the lifting elements are distinctly defined, thus limiting the magnitude of the force which a wave exerts upon the bow, due to water being released at the step. The provision of the elevated bottom 14 has the further advantage that the highest waves over which the vehicle passes will strike up against the bottom with smaller impact forces, and will thus produce less resistance to forward travel.

From the foregoing description taken together with the accompanying drawings it will be apparent that this invention provides an air cushion vehicle which is especially well adapted for overwater travel, and that the invention, more particularly, provides means on such a vehicle for breaking the force of waves which the vehicle encounters and for increasing the efficiency of the vehicle and the smoothness of its ride over rough or choppy water by minimizing the resistance forces that the water can exert upon the vehicle when waves are encountered.

What is claimed as my invention is:
1. An air cushion vehicle adapted to be supported at a distance above the surface of land or water by a flow of air expelled downwardly from the vehicle, said vehicle being characterized by the following:
   (A) a body which is
      (1) substantially rectangular in planform, being elongated from front to rear,
      (2) and which has its bottom surface transversely concave so as to be lowest along the sides of the body;
   (B) means on the body defining narrow, elongated downwardly opening air outlets, one of which extends transversely across the body near the front thereof and has the shape of a shallow V with its point foremost and on the longitudinal centerline of the vehicle;
   (C) a bow portion on the front of the body having bottom wall portions
      (1) which are obliquely inclined in opposite sidewardly and outwardly facing directions to the longitudinal centerline of the body, so as to be disposed in a shallow V having its point foremost and on said centerline, and
      (2) which are obliquely rearwardly and downwardly inclined, and
      (3) which have their rear edges at said one air outlet and at a level below that of the bottom wall of the body therebehind so as to define a step-like discontinuity at said outlet; and
   (D) at least three lengthwise extending lifting elements on the bow portion, each capable of producing hydrodynamic lift in consequence of forward motion through water,
      (1) said lifting elements being at spaced locations across the vehicle and symmetrically disposed with respect to the longitudinal centerline of the vertical, and
      (2) said lifting elements having their hydrodynamic lift centers located on a V shaped line, the legs of which are spaced forwardly of and extend substantially parallel to the legs of the V defined by said one air outlet.

2. In an air cushion vehicle adapted to be supported at a distance above the surface of land or water by flow of air expelled downwardly from the vehicle:
(A) a body which is elongated in the fore-and-aft direction and which has
   (1) a transversely concave bottom surface and
   (2) narrow, elongated downwardly opening air outlets, one of which extends transversely across substantially the entire body near its front and has substantially a V shape as seen from below, with its point foremost and on the longitudinal centerline of the vehicle;
(B) a bow portion on the front of the body having wall portions
   (1) which extend obliquely downwardly and rearwardly from the front of the body, and
   (2) which terminate at their lower rear edges at said one air outlet and at a level below the bottom wall of the body so as to define a step-like discontinuity at said air outlet; and
(C) at least three lengthwise extending pontoon-like lifting elements on said bow portion, each adapted to produce hydrodynamic lift reaction in consequence of forward motion of the vehicle with the lifting elements in water, said lifting elements being
   (1) located at spaced intervals across the width of the vehicle and
   (2) disposed symmetrically with respect to the longitudinal centerline of the vehicle,
   (3) said lifting elements having their rear ends at said one air outlet, and
   (4) having their hydrodynamic lift centers on a V shaped line which has its point foremost and on the longitudinal centerline of the body.

3. An air cushion vehicle of the type which is supported at a distance above the surface of water by displaced air expelled through downwardly opening outlets in the vehicle, which vehicle has the following characterizing features that cooperate to break the force of waves striking its forward portion:
(A) a narrow elongated air outlet near the front of the vehicle which extends entirely across the vehicle substantially in the shape of a shallow V with its point at the longitudinal centerline of the vehicle and with its legs extending obliquely rearwardly and sidewardly from its point;
(B) a bow portion on the vehicle which has a bottom wall
   (1) that is inclined rearwardly and downwardly
   (2) and which terminates at its rear at said air outlet;
(C) a bottom wall portion on the vehicle behind said outlet which is at a level above that of the rear edge of said bottom wall of the bow portion so as to cooperate with the latter in defining an upward step in the bottom of the vehicle; and
(D) at least three lengthwise extending pontoon-like lifting elements on the bow portion, each capable of producing hydrodynamic lift in consequence of its forward motion in water,
   (1) said lifting elements being spaced apart across the width of the vehicle and
   (2) being symmetrically disposed with respect to the longitudinal centerline of the vehicle,
   (3) each of said lifting elements terminating at said air outlet, and
   (4) said lifting elements having their centers of hydrodynamic lift on a substantially V shaped line across the vehicle that has its legs substantially parallel to the legs of said air outlet.

4. An air cushion vehicle adapted to be supported at a distance above the surface of land or water by downward displacement of air, said vehicle being characterized by:
(A) a body having a downwardly opening air outlet extending transversely thereacross near its front;
(B) a bow portion on the body in front of said air outlet; and
(C) at least three hydrodynamic lifting elements on said bow portion,
   (1) each of said lifting elements being elongated lengthwise of the vehicle, terminating at its rear at said air outlet, and projecting downwardly substantially below the remainder of the bow portion,
   (2) said lifting elements being located at spaced intervals transversely across the vehicle and being disposed symmetrically with respect to the longitudinal centerline of the vehicle, and
   (3) said lifting elements being so arranged that their centers of hydrodynamic lift are on a V shaped line which is spaced forwardly of said air outlet and which has its point foremost and on the longitudinal centerline of the vehicle.

References Cited in the file of this patent
UNITED STATES PATENTS

| | | |
|---|---|---|
| 2,483,663 | Nowak | Oct. 4, 1949 |
| 2,989,939 | Tatter | June 27, 1961 |
| 2,999,475 | Kautz | Sept. 12, 1961 |
| 3,027,860 | Priest | Apr. 3, 1962 |

FOREIGN PATENTS

| | | |
|---|---|---|
| 379,020 | France | Aug. 28, 1907 |
| 919,166 | France | Nov. 18, 1946 |
| 1,053,535 | France | Sept. 30, 1953 |
| 1,255,604 | France | Jan. 30, 1951 |
| 418 | Great Britain | of 1877 |
| 893,715 | Great Britain | Apr. 11, 1962 |

OTHER REFERENCES

Flight International Supplement, Aug. 23, 1962, page 26 relied on.

Hovering Craft & Hydrofoil, August–September 1962, pages 18–20 relied on.

UNITED STATES PATENT OFFICE
CERTIFICATE OF CORRECTION

Patent No. 3,161,171

December 15, 1964

Olle Ljungström

It is hereby certified that error appears in the above numbered patent requiring correction and that the said Letters Patent should read as corrected below.

Column 4, line 25, and column 5, line 1, for "adapated", each occurrence, read -- adapted --; column 4, line 70, for "vertical" read -- vehicle --.

Signed and sealed this 20th day of April 1965.

(SEAL)
Attest:

ERNEST W. SWIDER
Attesting Officer

EDWARD J. BRENNER
Commissioner of Patents